United States Patent [19]

Maher et al.

[11] Patent Number: 5,134,379
[45] Date of Patent: Jul. 28, 1992

[54] CAPACITIVE MATERIAL PRESENCE DETECTING APPARATUS

[75] Inventors: Anthon J. Maher, Vermont South; Richard E. Junger, Hawthorn, both of Australia

[73] Assignee: Detection Systems Pty., Ltd., Victoria, Australia

[21] Appl. No.: 499,316

[22] PCT Filed: Oct. 3, 1988

[86] PCT No.: PCT/AU88/00387
§ 371 Date: May 29, 1990
§ 102(e) Date: May 29, 1990

[30] Foreign Application Priority Data

Oct. 2, 1987 [AU] Australia .................. PI 4689/87

[51] Int. Cl.[5] .................................... G01R 27/26
[52] U.S. Cl. ................................ 324/663; 324/690
[58] Field of Search ............ 324/661, 662, 663, 687, 324/688, 690; 340/870.37

[56] References Cited

U.S. PATENT DOCUMENTS

| | | | |
|---|---|---|---|
| 3,039,051 | 6/1962 | Locher | 324/688 |
| 3,684,089 | 8/1972 | McMeekin | 324/662 |
| 3,812,424 | 5/1974 | Abbe | 324/688 |
| 4,112,744 | 9/1978 | Tassano | 324/681 |
| 4,322,678 | 3/1982 | Capots et al. | 324/688 |
| 4,683,418 | 7/1987 | Wagner et al. | 324/664 |
| 4,922,181 | 5/1990 | Pullan | 324/690 |
| 4,958,129 | 9/1990 | Poduje et al. | 324/661 |

Primary Examiner—Kenneth A. Wieder
Assistant Examiner—Maura K. Regan
Attorney, Agent, or Firm—Lowe, Price, LeBlanc & Becker

[57] ABSTRACT

Apparatus for detecting the amount or presence of material in a detection zone comprising a first electrode, input signal means for supplying an electric input signal to the first electrode; a second, smaller electrode parallel to the first electrode; the detection zone being located between the first and second electrodes; a third electrode which is larger than the second electrode and substantially surrounds the second electrode in a plane parallel to the first electrode, and receiving means for detecting signals on the second electrode, the signal on the second electrode being responsive to material in the zone. The second and third electrodes are not electrically connected but are maintained at near the same electric potential whereby the electric field between the first and second electrodes is, in use, substantially linear and fringing fields, if any, occur only between first and third electrodes at their outer edges.

16 Claims, 5 Drawing Sheets

FIG 4

FIG_5

FIG_6

CAPACITIVE MATERIAL PRESENCE DETECTING APPARATUS

This invention relates to detecting apparatus.

More particularly, the invention relates to detecting apparatus for detecting the amount or presence of material in a detection zone.

In many manufacturing systems, it is of importance to know very accurately the number of articles which have been placed in a package. In some circumstances it is not possible to obtain satisfactory checking information by visual inspection or by weighing. It is thus an object of the invention to provide detecting apparatus which can provide very accurate information as to the amount or presence of material in a detection zone. The packages are conveyed into the detection zone and the amount or quantity of material in the packages can be monitored by the apparatus of the invention.

According to the present invention there is provided apparatus for detecting the amount or presence of material in a detection zone, said apparatus comprising:

a first electrode;

input signal means for supplying an electric input signal to the first electrode;

a second electrode, said detection zone being located between said first and second electrodes;

a third electrode which substantially surrounds the second electrode and is larger than the second electrode; and receiving means for detecting signals on the second electrode, the signal on the second electrode being responsive to material in the zone.

Preferably, the second and third electrodes are not electrically connected but are maintained at near the same electric potential whereby the electric field between the first and second electrodes is, in use, substantially linear and fringing fields, if any, occur only between the first and third electrodes at their outer edges.

Preferably the second electrode is narrow so that a narrow slice of material in the zone is detected. This enables very accurate monitoring so carried out compared to known techniques which, generally speaking, scan only relative wide areas and are affected by fringing fields.

Apparatus of the invention can be very conveniently arranged to operate on a conveyor line upon which packaged articles pass. The articles pass through the detection zone and hence the articles pass between the first electrode and the second and third electrodes. Preferably the first electrode comprises a plate over which the article pass and the second and third electrodes are located above the first electrode. The input signal means may comprise an oscillator for applying a sinusoidal voltage to the first electrode. The detecting means may comprise an operational amplifier having a known capacitive feedback loop. The arrangement is such that articles in the detecting zone, especially nonmetallic articles, alter the effective dielectric properties within the zone thereby altering the effective capacitance between the first and second electrodes. This alteration is reflected at the output of the operational amplifier and with suitable detecting circuitry can be used to provide information as to the number of articles in a package or the quantity of material in a package.

In accordance with the present invention there is also provided a detection circuit for detecting the amount or presence of material in a detection zone, said circuit comprising:

a first electrode and a second electrode, said detection zone being located between said first electrode and said second electrode, and said first electrode being supplied, in use, with an electric input signal; and an operational amplifier with an input connected to said second electrode and having a capacitor in a feedback loop between said input the output of the amplifier, the signal outputted by the amplifier being responsive to the material in the zone.

In accordance with the present invention there is also provided a detection device for use in detecting the amount or presence of material in a detection zone, said device comprising:

a first electrode;

a second electrode substantially parallel with respect to and opposite said first electrode; and a third electrode which substantially surrounds, is substantially electrically isolated with respect to and is larger than said second electrode;

said detection zone being located between said first electrode and said second electrode.

The invention will now be further described with reference to the accompanying drawings, in which.

Figure 1:
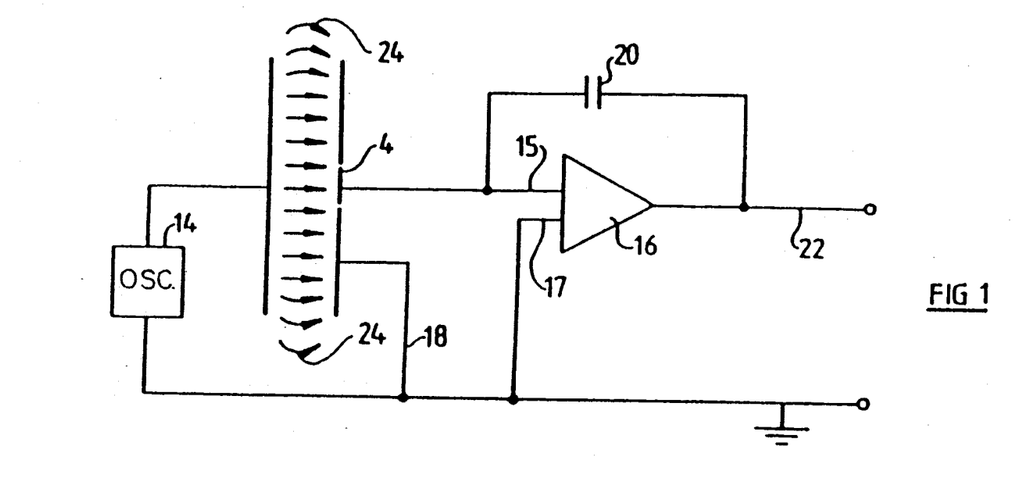
FIG. 1 is a schematic view of detection apparatus of the invention.
Figure 2:
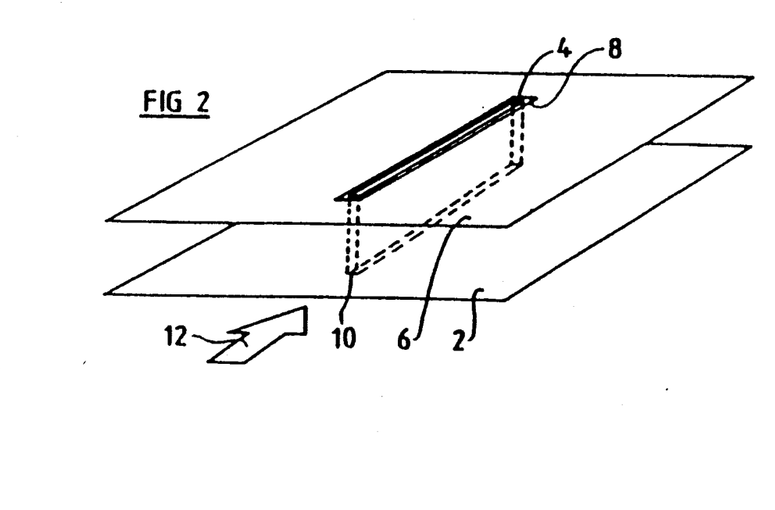
FIG. 2 shows one configuration of the electrodes.

The detection apparatus diagrammatically illustrated in FIG. 1 comprises a first electrode 2 which comprises a metallic plate. Spaced from the electrode 2 are second and third electrodes 4 and 6. As best seen in FIG. 2, the third electrode 6 is parallel to the first electrode 2 and is the same size as the first electrode. The second electrode 4 is in the form of a strip which is located in an opening 8 formed in the third electrode 6. In use of the apparatus, articles to be monitored pass into a detection zone 10 (shown in broken lines) which is between the electrodes 2 and 4. A conveyor (not shown) conveys articles to the zone 10 generally in the direction of arrow 12 so as to pass through the zone 10. The presence of the articles affects the dielectric properties (especially the permativity) of the zone 10 and this can be monitored as explained hereinafter.

The detecting apparatus includes an oscillator 14 the output of which is coupled to the first electrode 2. The second electrode 4 is coupled to one input 15 of an operation amplifier 16. The other input 17 is earthened, as shown. A feedback capacitor 20 is coupled from the output 22 of the amplifier 16 to the first input 15. The effective capacitance of the first and second plates 2 and 4 is well defined and so the ratio of that capacitance with that of the capacitor 20 is also well defined. Thus any variation in the effective dielectric properties of the zone 10 will affect the signal level present on the output 22 of the amplifier 16.

When a package containing a correct number or amount of material passes through the zone 10, the output 22 will produce a "normal" response. When however a package having more or less material herein passes through the zone 10, the output signal will differ from the normal response. If it is above or below predetermined limits, appropriate signals can be generated to indicate that the packaging has been incorrect so that appropriate action can be taken with respect to the defective packages.

The oscillator 14 is operable over a relatively wide range of frequencies. It is operable at least between 5 kHz to 1 MHz but preferably is about 80 kHz. It has a sinusoidal input preferably 12 volts peak to peak. The capacitance between the electrodes 2 and 4 is typically of the order of 0.1 pF and the capacitance 20 is typically 4.5 pF. However the capacitance between the electrodes 2, and 4 can range from 0.001 pF to several pF or more.

The amplifier 16 preferably is a high gain amplifier so that its input 15 will be at virtual earth. This is an important feature because the electrode 6 which is located very close to the electrode 4 is also at earth potential. Therefore the electric field from the plate 2 to the plate 4 passing through the zone 10 will be substantially linear because the field behaves as though the plates 4 and 6 form part of a single plate because they are held at substantially the same potential. Any fringing fields 24 will thus occur only between the peripheries of the plates 2 and 6, as indicated in FIG. 1. It will be appreciated that it is desirable to keep the gap between the second and third electrodes 4 and 6 as narrow as possible. Typically the gap is less than 1 mm. The gap can be filled if necessary with an insulating material. The space between the plates 4 and 6 (and 2) can be varied in accordance with the size of the packaging which passes between the electrodes. This variation will require the apparatus to be recalibrated because of the change of capacitance between the plates.

Figure 3:
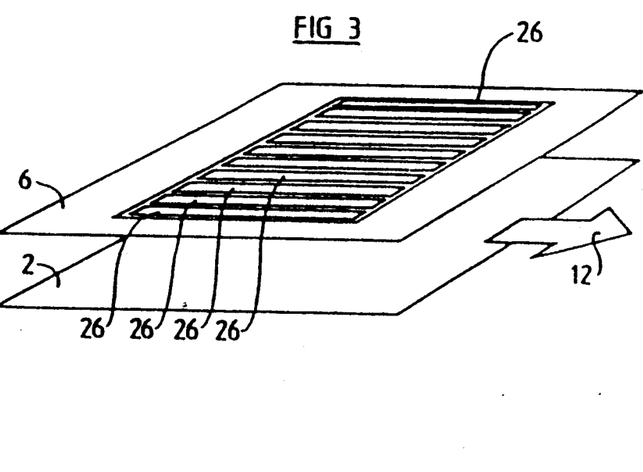
FIG. 3 shows another configuration of the electrodes.

In some circumstances, it may be desirable to include more than one plate corresponding to the second plate 4 so that a number of articles can be scanned simultaneously on a conveyer line. Further, a plurality of strip electrodes 26 may be provided in a side by side relationship, as shown in FIG. 3. Each of the strip electrodes functions analogously to the electrode 4 of FIG. 2. The strip electrodes 26 can be connected to inputs of separate amplifiers or alternatively switching or multiplexing techniques can be used to sequentially sample the outputs of the various electrodes 26.

In a further modification a two dimensional array of second electrodes 4 may be provided in an opening in the third electrode 6.

It will be appreciated by those skilled in the art that many refinements can be incorporated into the circuitry for processing of the signal output from the second electrode 4 and/or the amplifier 16 so as to eliminate the effects of noise, to give fast response times, etc.

Figure 4:
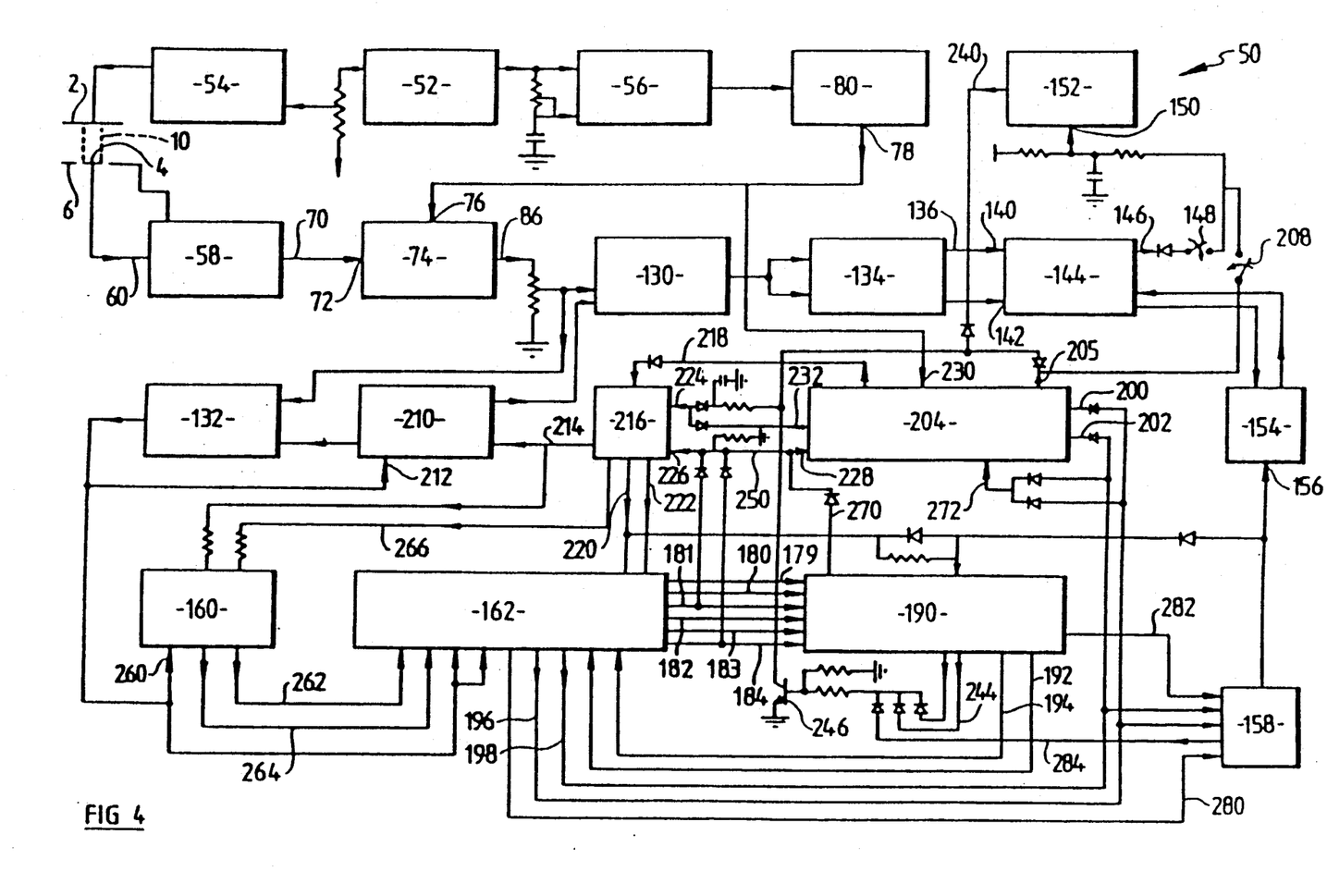
FIG. 4 is a block diagram of a preferred embodiment of a detection circuit of the detection apparatus.

A preferred detection circuit 50 of the detection apparatus is illustrated in FIG. 4. The detection circuit 50 includes a signal generator 52 which generates and supplies a sine wave voltage of approximately 80 kHz to a transmitted signal amplifier 54 and a phase shift circuit 56. The transmitted signal amplifier 54 amplifies the signal received from the generator 52 and supplies the amplified signal to the first electrode 2 of the apparatus.

The signal produced on the second electrode 4 as a result of the signal applied to the first electrode 2 is inputted, as a received signal, to a received signal amplifier 58, which is also connected to the third electrode 6.

Figure 5:
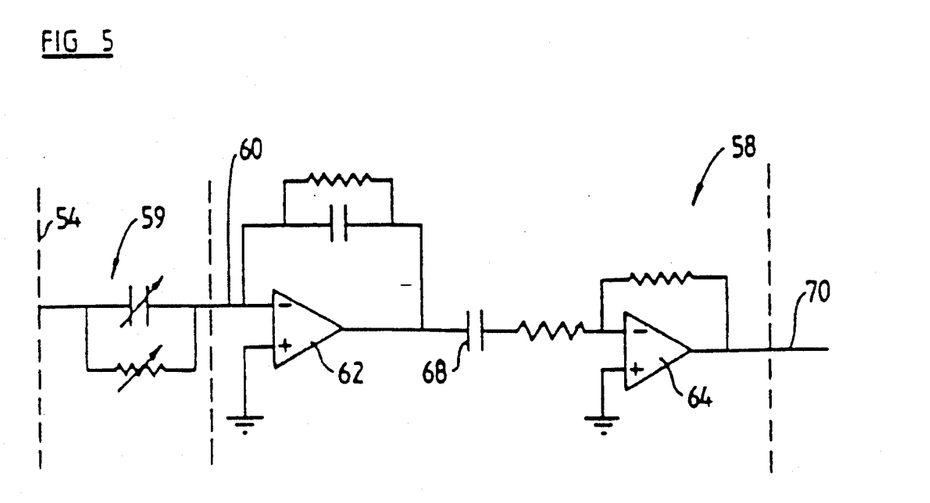
FIG. 5 is a circuit diagram of a received signal amplifier and the electrodes of the detection circuit.

When an object passes between the first and second electrodes 2 and 4 and the detection zone 10, the object, whilst altering the capacitance between the first and second electrodes 2 and 4, also alters the resistance between the electrodes 2 and 4. The equivalent electric circuit 59 of the first and second electrodes 2 and 4 is illustrated in FIG. 5 and is shown coupled to the received signal amplifier stage 58. The equivalent circuit 59 comprises a variable capacitance and a variable resistance which are connected in parallel. The equivalent circuit 59, of course, receives the signal outputted by the transmitted signal amplifier 54 and outputs the received signal on the second electrode 4 to the input 60 of the received signal amplifier 58. The received signal amplifier 58 includes two operational amplifiers 62 and 64, the inverting input of the first amplifier 62 being the input 60 of the received signal amplifier 58. The non-inverting input of the first amplifier 62 is connected to ground and to the third electrode 6, so that the input 60 is held at virtual earth, as discussed with reference to FIG. 1. The first amplifier 62 has a feedback loop to the inverting input that includes a resistor and capacitor in parallel. The relationship between the voltage at the output of the first amplifier 62 and the voltage inputted to the first electrode 2 by the transmitted signal amplifier 54 is given by equation 1 below.

$$\frac{V_0}{V_i} = \frac{1/R_t + j\omega C_t}{1/R_f + j\omega C_f} \qquad 1$$

Where:

$V_o$ is the voltage at the output of the first amplifier 62;

$V_i$ is the voltage inputted by the transmitted signal amplifier 54 to the first electrode 2;

$\omega$ is the frequency of the signal outputted by the transmitted signal amplifier 54;

$R_t$ and $C_t$ are the resistance and capacitance between the first and second electrodes 2 and 4; and $R_f$ and $C_f$ are the resistance and capacitance in the feedback loop of the first amplifier 62.

The resistances $R_t$ and $R_f$ are relatively large and do not affect the amplitude of the signal outputted by the first amplifier 62 to the same degree as the effect caused by fluctuations in the capacitance $C_t$, due to the entry of objects into the detection zone 10. As discussed previously with reference to FIG. 1, the fixed capacitance $C_f$ is about 4.5 pF and the capacitance between the electrodes 2 and 4 varies over a wide range of pFs depending on the objects inserted therein. Although the resistances $R_t$ and $R_f$ have negligable effect on the amplitude, it is desirable to consider them with respect to the phase change imparted on the inputted signal by the first and second electrodes 2 and 4 and the first amplifier 62. Some objects have little effect on the phase change whilst other objects have a marked effect and this can be exploited in the detection process, as discussed hereinafter. The signal at the output of the first amplifier 62 is passed, via a coupling capacitor 68 to the second amplifier 64, which is configured as an inverting linear amplifier. The output of the second amplifier 64 is the output 70 of the received signal amplifier 58 and the signal present at the output 70 will hereinafter be referred to as the electrode signal.

The output 70 of the received signal amplifier 58 is connected to a first input 72 of a phase detection circuit 74. A second input 76 of the phase detection circuit 74 receives a reference signal from the output 78 of a reference signal amplifier 80, which amplifies the signal outputted by the phase shift circuit 56. The phase shift circuit 56 produces and outputs a square wave version of the signal generated by the generator 52. The phase shift circuit 56 also introduces a predetermined phase shift with respect to the signal generated by the generator 52 so that the reference signal inputted to the phase detection circuit 74 is a square wave of the same frequency as the electrode signal but has a predetermined phase shift with respect to the electrode signal.

Figure 6:
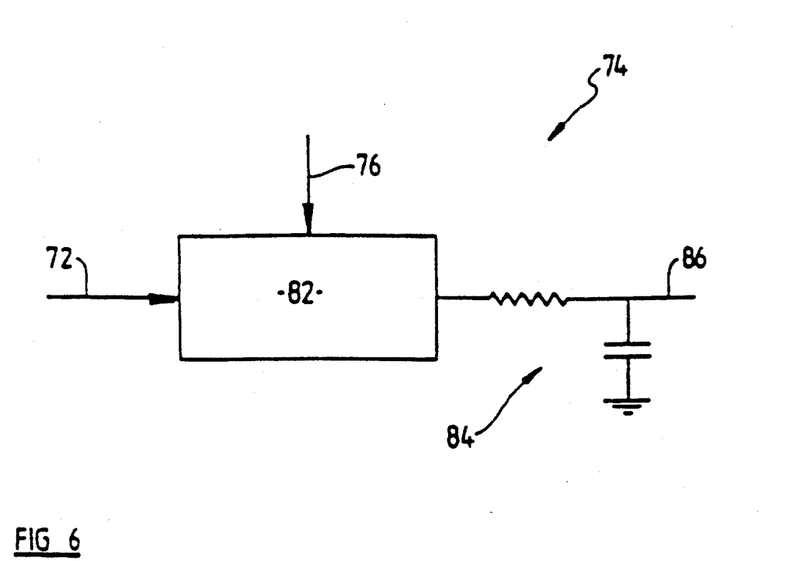
FIG. 6 is a diagram of a phase detection circuit of the detection circuit.

The phase detection circuit 74, as shown in FIG. 6, comprises a phase sensitive detector 82 and a standard RC low pass filter 84, which is used to attenuate all of the AC components of the signal outputted from the phase sensitive detector 82. The phase sensitive detector 82 receives the reference signal from the second input 76 and the electrode signal from the first input 72. The phase sensitive detector 82 superimposes the reference signal and the electrode signal and outputs the result to the low pass filter 84. Thus, the reference signal samples the electrode signal periodically as desired. The signal produced at the output 86 of the low pass filter 84, which is the output of the phase detection circuit 74 is a detection signal which is DC and has an amplitude which fluctuates in response to objects traversing the detection zone 10. By virtue of these fluctuations in amplitude the detection signal is effectively a low frequency signal. The remainder of the detection circuit 50 uses the detection signal as a basis for determining whether to accept or reject articles passing through the detection zone 10 which correspond to the signal.

The voltage of the detection signal which appears at the output 86 of the phase detection circuit 74 is given by equation 2 set out below.

$$V_d = \frac{V_o V_r}{2} + \frac{V_e V_r}{\pi} \cos \phi \qquad 2$$

Where $V_o$ is a constant dc component;

$V_r$ is the voltage of the reference signal;

$V_d$ is the voltage of the detection signal;

$V_e$ is the voltage of the electrode signal received at the input 72 of the phase detection circuit 74; and $\phi$ is the difference in phase between the electrode signal and the reference signal received on the second input 76 of the phase detection circuit 74.

Figure 7:
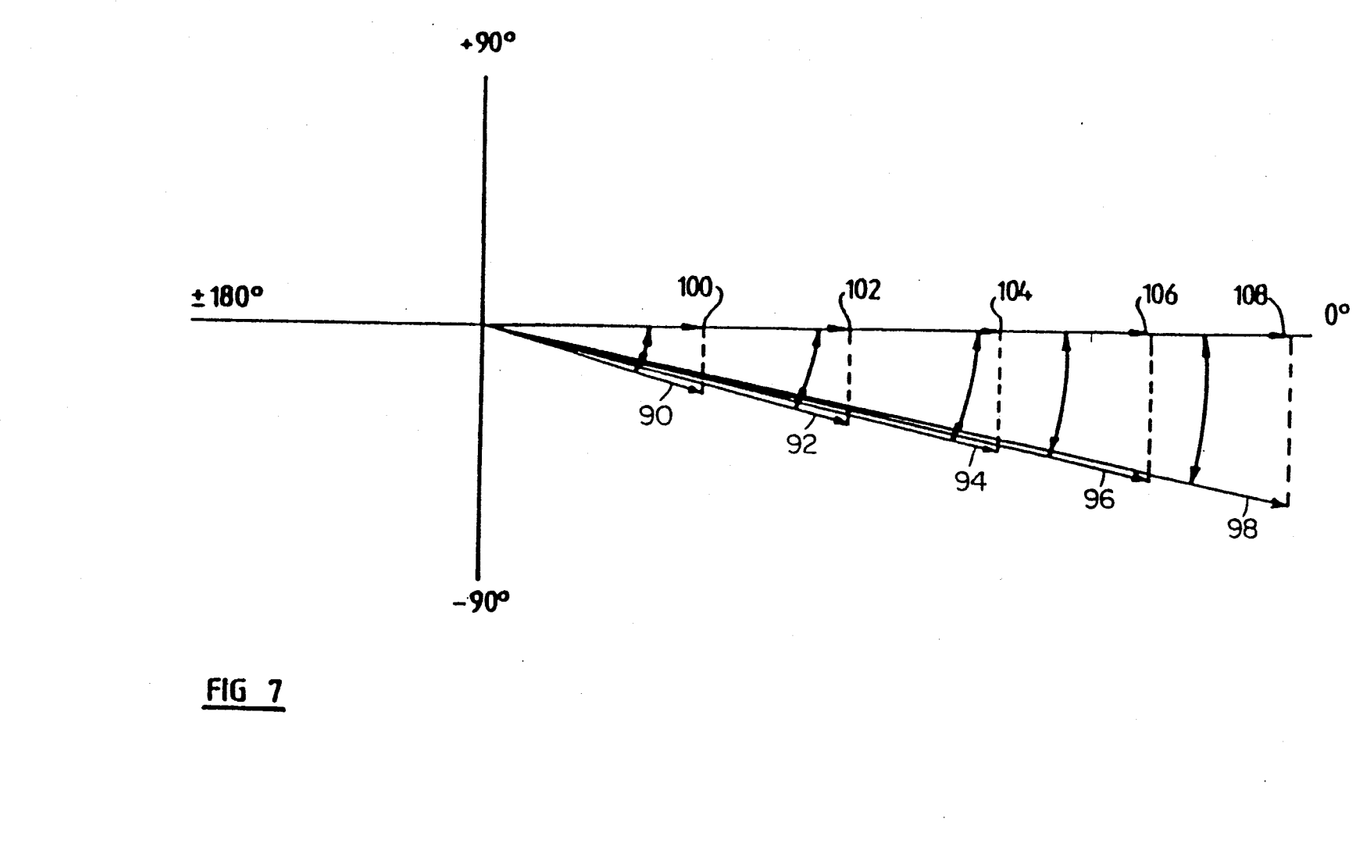
FIG. 7 is a first phasor diagram illustrating generation of a detection signal of the detection circuit.

The phasor diagram shown in FIG. 7 illustrates the relationship between the electrode signal and the detection signal produced when packets containing surgical gauze swabs are placed in the detection zone 10. The swabs are extremely thin and do not significantly alter the phase of the electrode signal on being inserted into the detection zone 10, as can be seen by comparing the voltage $V_{e0}$ 90 of the electrode signal when the detection zone 10 is empty with the voltage $V_{e1}$ 92 when a packet containing one swab is present in the zone 10. By virtue of the well defined capacitance $C_t$ of the detection zone 10, however, the presence of the swab causes a significant change in the capacitance $C_t$ which gives rise to a significant increase in the amplitude of the electrode signal, $V_{e1}$ 92, compared to the signal, $V_{e0}$ 90, when the zone 10 is empty. This is also illustrated with respect to the voltages produced when two swabs are present in the zone 10, $V_{e2}$ 94, three swabs $V_{e3}$ 96, and four swabs $V_{e4}$ 98, as shown in FIG. 7. In this instance, the electrode signals $V_{e0}$ 90, $V_{e1}$ 92, $V_{e2}$ 94, $V_{e3}$ 96 and $V_{e4}$ 98 lag the reference signal by about 35° and give rise to detection signals $V_{d0}$ 100, $V_{d1}$ 102, $V_{d2}$ 104, $V_{d3}$ 106 and $V_{d4}$ 108, respectively, as shown in FIG. 7. Thus the level of the detection signal increases for each swab placed in the zone 10 and by analysing the level of the detection signal produced a reject or accept decision with respect to a packet can be made. For example, if only packets containing three swabs are acceptable then only packages which produce a detection signal having a level which is approximately equal to that of $V_{d3}$ 106 are accepted. An acceptance range or window is established which includes $V_{d3}$ 106 and any packet which does not produce a detection signal having a voltage within this window, when the packet is centered on the detection zone, is rejected thereafter.

Figure 8:
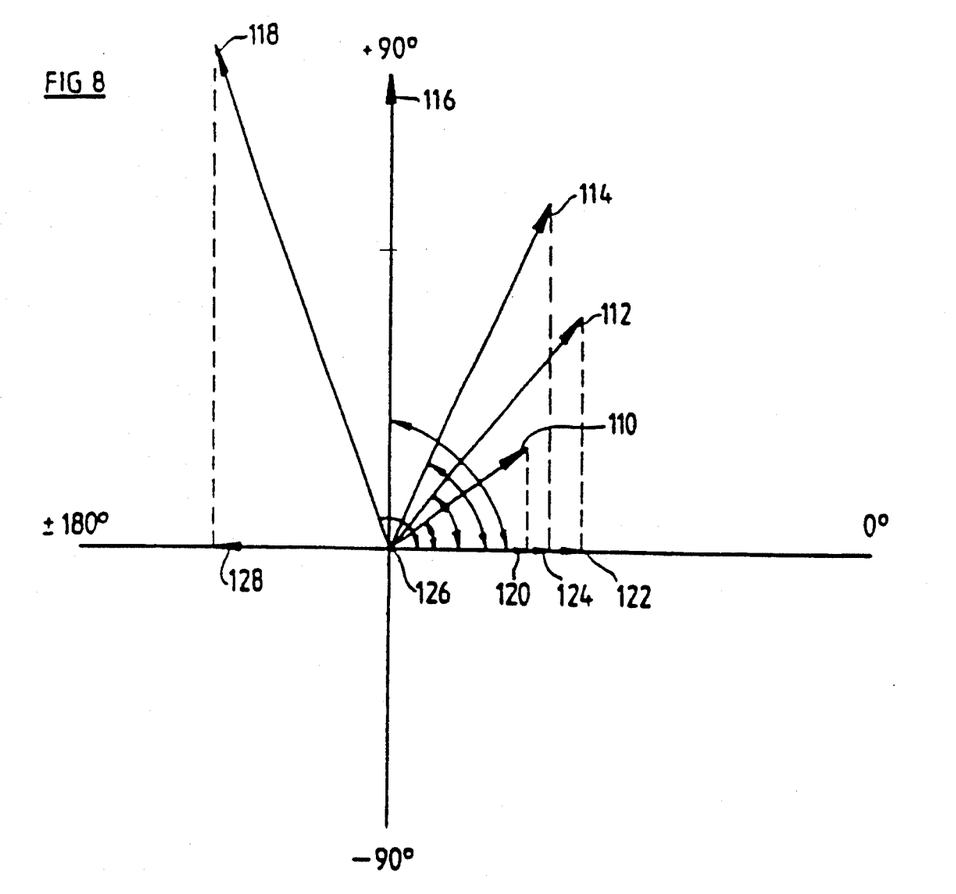
FIG. 8 is a second phasor diagram illustrating generation of a detection signal of the detection circuit.

Whilst the apparatus of the present invention is particularly advantageous for detecting the presence of extremely thin objects, such as surgical swabs, which do not produce significant changes in phase of the electrode signal, the circuit 50 may also be used to monitor objects, such as food packs, which produce significant changes in the phase of the electrode signal. The phasor diagram of FIG. 8 illustrates one example where the phasor $V_{e0}$ 110 is the voltage of the electrode signal when the detection zone 10 is empty, $V_{e1}$ 112 is the voltage of the electrode signal when the detection zone 10 contains a package including one food pack, $V_{e2}$ 114 two food packs, $V_{e3}$ 116 three food packs, and $V_{e4}$ 118 four food packs. The phase of the electrode signal changes significantly as further food packs are included in the detection zone, with the change being approximately 15° to 20° for each food pack. As further food packs are inserted into the detection zone 10 the capacitance $C_t$ increases thereby causing an increase in the magnitude of the electrode signal $V_{e0}$ 110 to $V_{e4}$ 118, as shown in FIG. 8. The significant phase shift introduced by the food packs is exploited to enhance the detection process by adjusting the phase of the reference signal, using the phase shift circuit 56, so that packages to be accepted produce an electrode signal which is substantially 90° out of phase with respect to the reference signal. This gives rise to a zero level detection signal $V_{d3}$ 126. Packages with more or less food packs than the desired number produce detection signals which are either positive, i.e. $V_{d0}$ 120, $V_{d1}$ 122, and $V_{d2}$ 124, or negative, i.e. $V_{d4}$ 126, and these packages are rejected. Thus the acceptance window is set so as to accept packages which produce a substantially zero level detection signal, i.e. those containing three food packs.

The detection circuit 50 of the apparatus includes circuitry for making a reject or accept decision on the basis of an analog signal and circuitry for making a reject or accept decision on the basis of digital signals. The circuitry used may be selected as desired depending on the detection operation to be performed. The decision based on the analog signal is with respect to whether the detection signal exceeds a threshold level whereas the decision based on the digital signals is with respect to whether the detection signal falls within an acceptance window.

The detection signal produced by the phase detection circuit 74 is inputted to a first low frequency amplifier 130 and a second low frequency amplifier 132. Both low frequency amplifiers 130 and 132 are used to amplify the detection signal within a low bandwidth and remove any high frequency interference signals, such as noise.

The output of the first low frequency amplifier 130 is passed to the inputs of a positive and negative rectifier 134, which rectifies any positive part of the detection signal and places the result on a first output 136 and rectifies any negative part of the detection signal and places the result in a second output 138. The two outputs 136 and 138 are connected directly to the positive and negative inputs 140 and 142, respectively, of an adder and level detector circuit 144. The adder part of the adder and level detector circuit 144 inverts the polarity of any signal appearing on the negative input 142 and adds the inverted signal to any signal appearing on the positive input 140. The sum signal produced as a result of the addition performed by the adder part is submitted to the level detector part of the circuit 144 and if the sum signal exceeds a predetermined threshold then the output 146 of the adder and level detector circuit 144 goes low. If an analog control switch 148 is closed, the input 150 of a reject relay circuit 152 will receive the signal on the output 146 of the adder and level detection circuit 144 and will also be pulled low, thereby activating a series of reject relays (not shown).

The reject relay circuit 152 on receiving a low signal on the input 150 first activates a relay or relays to cause indications, either audible or visual, to be made to a user of the apparatus 50 that a package present in the detection zone 10 is to be rejected. Secondly, after a predetermined delay to allow the package between first and second electrodes 2 and 4 to leave the detection zone 10, a further relay or relays are activated by the reject relay circuit 152 to cause the package to be removed from the production line.

In some circumstances it may be desirable to submit the sum signal produced by the adder part of the adder and level detector circuit 144 to the level detector part of the circuit 144 at only certain periods of time. For example, the sum signal which is of interest may be produced well before the corresponding object is centrally disposed in the detection zone 10. Thus the sum signal needs to be stored and then submitted after a delay to the level detector part so that any reject signal produced is not sent to the reject relay circuit 152 too early. To enable this to be performed a flow control circuit 154 is provided which receives and holds the sum signal until a trigger signal is received on an input 156. When the trigger signal is issued the flow control circuit 154 inputs the stored sum signal to the level detector part of the adder and level detector circuit 144. The trigger signal is generated by a hold control circuit 158, as desired, in response to signals received from the digital circuitry of the detection circuit 50. The signals inputted by the digital circuitry to the hold control circuit 158 are described hereinafter. The control of the sum signal fed to the level detector part of the adder and level detector circuit 144 by the flow control circuit 154 and hold control circuit 158 may be disabled or enabled as desired. When enabled, the level detector part is prevented from receiving the sum signal directly from the adder part.

The output of the second low frequency amplifier 132 is passed to a return control circuit 160 and a comparator and latch circuit 162. In the comparator and latch circuit 132 six threshold levels are set as desired, three relating to the analysis of negative detection signals and three relating to the analysis of positive detection signals. Whether negative or positive detection signals will be analysed is determined by the manner in which the reference signal samples the electrode signal, as discussed previously. The three threshold levels for each polarity are low Wl, high Wh, and over Wo and are used to define, inter alia, the acceptance window.

For analysis of any detection signal three threshold levels are selected one low Wl, one high Wh and one over Wo, each being positive or negative depending on the intended fluctuation of the detection signal to be analysed. The high level Wh is always selected to between the other two levels Wl and Wo and the acceptance window to be between Wl and Wh, between Wh and Wo or anything over Wo. Anything lower than the low level Wl is to be ignored and thus the acceptance window is always chosen to be above Wl.

Figure 9:
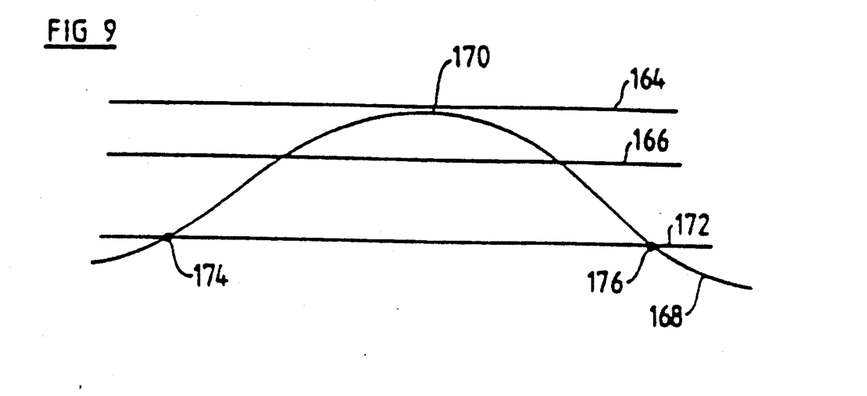
FIG. 9 is a diagram of a detection signal generated by the detection circuit.

For example, if positive signals are being examined the acceptance window may be defined between positive Wo 164 and positive Wh 166 and therefore FIG. 9 illustrates a detection signal 168 produced by an acceptable package on passing the first and second electrodes 2 and 4. The detection signal 168 reaches a peak 170 when the package is disposed uniformly and centrally in the detection zone 10. Any package which produces a detection signal having a peak which is less than Wh 166 or greater than Wo 164 is rejected. A decision is made with respect to every detection signal which goes above the Wl level 172. The Wl level 172 on the return crossing of the detection signal at point 176 as the package producing the detection signal leaves the detection zone, is normally adjusted with respect to the Wl level 172 on the initial crossing 174 so as to improve the response time enable parts of the detection circuit 50 to be reset ready for the detection signal produced by the succeeding package in the production line, as described hereinafter.

The comparator and latch circuit 162 compares the detection signal with the six threshold levels and outputs the results to six lines 179, 180, 181, 182, 183 and 184, respectively. The six lines 179 to 184 correspond to the three positive and negative threshold levels Wo, Wh and Wl, respectively, and if the detection signal passes a threshold level the corresponding line goes high, otherwise the lines 179 to 184 are low.

The digital word on the lines 179 to 184 is inputted to a decoder 190 of the detection circuit 50. The decoder 190 is configured so as to determine, on the basis of the digital word, whether an accept or reject condition has occurred. If the package in the detection zone 10 is to be rejected the decoder 190 outputs a positive or negative reject signal, depending on whether a positive or negative detection signal was analysed, on line 192 or 194, respectively, to the comparator and latch circuit 162. The reject signal is stored in a positive or negative reject latch of the comparator and latch circuit 162. The contents of the positive and negative reject latches are outputted respectively on lines 196 and 198 to respective inputs 200 and 202 of a NAND gate in a protection circuit 204 of the detection circuit 50. A rejection output 205 from the protection circuit 204 is the output of the NAND gate and is coupled to the triggering input 150 of the reject relay circuit 152, if a digital control switch 208 is closed. Thus the reject relay circuit 152 activates the reject relays, discussed previously, whenever the positive or negative reject latches in the comparator and latch circuit 162 are set by the decoder 190.

The detection circuit 50 also includes an amplifier disable circuit 210 which monitors the detection signal on the first input 212 and limits the low frequency amplifiers 130 and 132 so as to prevent the transistors of the amplifiers 130 and 132 from operating in the saturation region, whenever the detection signal exceeds a predetermined level. The amplifier disable circuit 210 also resets the amplifiers 130 and 132 whenever a reset signal is received on line 214 from an overshoot latch 216 of the detection circuit 50.

The overshoot latch 216 is used to ensure only one accept of reject decision is made with respect to each detection signal received which corresponds to a package passed through the detection zone 10. Whenever the overshoot protection latch 216 is set a reset signal is outputted on line 214 so as to cause the disable circuit 210 to reset the low frequency amplifiers 130 and 132. This inhibits the tail of a detection signal passed to the comparator and latch circuit 162. Latch outputs 220 and 222 of the protection latch 216 also go low and high, respectively, when the protection latch 216 is set so as to reset latches in the comparator and latch circuit 162 and the decoder 190 and disable the trigger input 156 to the flow control circuit 154.

The overshoot protection latch 216 includes a set input 224 and a reset input 226 which are activated when pulled low. The reset input 226 is normally held low so that the protection latch 216 is normally reset. The reset output 226 goes high whenever a detection signal inputted to the comparator and latch circuit 216 exceeds the positive or negative low threshold levels W1. The reset input 226 is connected to the positive W1 and negative W1 lines 181 and 184, as shown in FIG. 4. Placing the reset input 226 high enables the overshoot protection latch 216 to be set via the set input 224.

The reset input 226 is also connected to a count enable input 228 of the protection circuit 204. Placing the count enable input 228 high causes the protection circuit 204 to begin counting in increments from a predetermined value on receipt of the reference signal, from the reference signal amplifier 80, on a clock input 230 of the protection circuit 204. If the count ever exceeds a predetermined level, indicating the detection signal is not going to return below the positive or negative low threshold W1, then a time protection output 232 of the protection circuit 204 goes low which pulls the set input 224 low and causes the overshoot protection latch 216 to be set.

The overshoot protection latch 216 is also set when the reject output 205 of the protection circuit 204 goes low indicating a reject decision has been made, or when an output 240 of the reject relay circuit goes low indicating that the reject relays have been activated. If an accept decision is made on the basis of a positive detection signal or a negative detection signal a respective positive or negative acceptance output 242 or 244 of the decoder 190 goes high so as to activate a transistor 246. Activation of the transistor 246 pulls the set input 224 low and thereby sets the overshoot protection latch 216. Thus the overshoot protection latch 216 is set once an accept or reject decision has been made.

The reset signal forwarded to the disable circuit 210 on line 214 when the protection latch 216 is set is a sampling signal inputted to the overshoot protection latch 216 on line 218 from the protection circuit 204. The sampling signal is derived from the reference signal inputted on the clock input 230 of the protection circuit 204 and has a frequency which is a division of the reference signal frequency.

The protection latch 216 is allowed to be reset when the line 250 connected between the reset input 226 and the count enable input 228 is no longer held high by a positive or negative W1 line 181 or 184. The W1 lines 181 and 184 will be low when the detection signal returns below the W1 threshold level. As sufficient information to make an accept or reject decision is normally obtained from the detection signal well before the signal returns below the preset low threshold level W1, the preset W1 stored in the comparator and latch circuit 162 is adjusted, or increased, after the detection signal initially crosses the W1 level, at point 174 as illustrated in FIG. 9. This adjustment is performed by the return control circuit 160 which receives the detection signal on an input 260 and uses the incoming detection signal to charge one of two capacitors, depending on the polarity of the detection signal. The voltages across the capacitors are inputted on lines 262 and 264, respectively, to the comparator and latch circuit 162 so as to increase the positive or negative low threshold level W1, respectively. Thus, with reference to the example illustrated in FIG. 9, the threshold level W1 is increased so that the return crossing point 176 occurs earlier. This ensures the overshoot protection latch 216 is reset before the next package enters the detection zone 10 and improves the response time of the detection circuit. The positive and negative capacitors are discharged by the reset signal on line 2 and 14 and an inverted version of the reset signal on a line 266, respectively, when the overshoot protection latch 216 is set.

If, however, the detection signal returns below the low threshold level W1 before an accept or reject decision is made the overshoot protection latch 216 is prevented from resetting by a high signal on a zero crossing output line 270 from the decoder 190. The zero crossing output line 270 goes high when the detection signal falls between the positive and negative low threshold levels W1 after having been above the low levels. The zero crossing output line 170 remains high until an accept or reject decision has been made.

When the count enable input 228 goes low after having been high the count conducted by the protection circuit 244 then begins proceeding in decrements rather than increments. The protection circuit 244 also begins counting down when a reject signal is received on an input 272 which is connected to the reject latches of the comparator and latch circuit 162, via the lines 196 and 198. As, in most cases, the detection signals received by the detection circuit 50 are symmetrical and periodic, therefore the count performed by the protection circuit 204 should be symmetric. Thus, if desired, the protection circuit 244 can be used to set the overshoot protection latch 216 via the time protection output 232 if the count reaches zero, in order to protect the low frequency amplifier 130 and 132 from abnormal fluctuations of the detection signal.

The inputs to the hold control circuit 158, discussed previously, are a low threshold comparator output 280 from the comparator and latch circuit 162, a zero crossing output 282 from the decoder 190 and the lines 196 and 198 which are connected to the positive and negative reject latches of the comparator and latch circuit 162. The hold control circuit 158 can also be used to provide a reject inhibit signal on an inhibit line 284 which activates the transistor 246 so as to set the overshoot protection latch 216 when the reset input 226 is high.

A prototype of the apparatus of the invention has been tested and found to be capable of very accurate monitoring of the number articles in a package. For instance it has been tested with packages or gauze swabs for surgical use. The swabs are 7.5×7.5 cm and typically five or ten are provided in a package. It is very important to know whether through error an additional swab has been included in the package. If an additional swab is present there is a possibility that it may be left inside the body of a patient being operated upon. It is the practice of theatre staff to count the number of used swabs at the end of an operation to check that all have been removed from the patient. It will be appreciated that, if the wrong number of swabs is present in a pack, the usual checking procedure adopted may lead to error.

The apparatus of the invention can be used to scan for defects or inclusions in products, for instance air bubbles in confectionary or foreign bodies in solids for instance pieces of stone in bars of soap. The resolution monitoring in a direction transverse to the direction of movement of the articles is dependent on the number of second electrodes.

It will be appreciated that the second electrode 4 is narrow so that the inspection zone 10 is likewise narrow. The products can be introduced into the zone at a place where the products should be uniform. This enables accurate counting or monitoring to be carried out.

The principles of the invention can be applied to flow meters for solids or liquids passing through a conduit. The output signals from the electrode or electrodes can be integrated over time to give an indication of flow.

Many modifications will be apparent to those skilled in the art without departing from the spirit and scope of the invention.

We claim:

1. Apparatus for detecting the amount or presence of material in a detection zone (10), said apparatus comprising:
   a first electrode (2);
   input signal means (14, 52, 54) for supplying an electric input signal to the first electrode;
   a second electrode (4), said detection zone (10) being located between said first and second electrode (2 and 4);
   a third electrode (6) which substantially surrounds the second electrode (4) and is substantially larger than the second electrode (4); and
   receiving means (16, 58) for detecting signals on the second electrode (4), the signal on the second electrode (4) being responsive to material in the zone (10),
   said receiving means including a high gain amplifier (16) coupled to the second and third electrodes (4, 6) for maintaining said second and third electrodes at substantially the same electrical potential thereby to establish a substantially linear electric field between said first electrode (2) and said second electrode.

2. Apparatus as claimed in claim 1, wherein the second and third electrode and said high gain amplifier operate, in combination, for limiting fringing fields to occur only between the first and third electrode (2 and 6) at their outer edges.

3. Apparatus as claimed in claim 1, wherein said second electrode (4) is narrow so that a narrow slice of material in the zone (10) is detected.

4. Apparatus as claimed in claim 3, wherein said apparatus is configured to operate on a production line, wherein packaged articles pass through the detection zone (10), said first electrode (2) comprises a plate over which the articles pass and the second and third electrodes (4 and 6) are located above the first electrode (2).

5. Apparatus as claimed in claim 1, wherein said amplifier (16) comprises an operational amplifier (16, 62) with one input (15, 60) connected to said second electrode (4) and another input (17) connected to said third electrode (6) and ground, said amplifier (16, 62) having a capacitor (20) in a feedback loop between said one input (15, 62) and the output (22) of the amplifier (16, 62).

6. Apparatus as claimed in claim 5, further comprising means (144, 162, 190) for determining whether an acceptable amount of material is present in said zone (10) using the signal outputted by the amplifier (16, 62).

7. Apparatus as claimed in claim 6, wherein said input signal is a periodic signal having a predetermined frequency.

8. Apparatus as claimed in claim 7, wherein said input signal is a sinusoidal signal.

9. Apparatus as claimed in claim 7, further comprising means (74) for sampling and filtering the signal outputted by the amplifier (16, 52) so as to produce a detection signal having an amplitude which is representative of the amount of material in said detection zone (10) and is supplied to said detection means (144, 162, 190).

10. Apparatus as claimed in claim 9, wherein said detection means (144, 162, 190) includes a level detector which triggers means (152) for rejecting the material in said zone if said detection signal exceeds a predetermined threshold level.

11. Apparatus as claimed in claim 9, wherein said detection means (144, 162, 190) includes a decoder means (190) for determining if said detection signal lies within an acceptance window, and if said detection signal lies outside said acception window, said decoder means (190) issues a signal which cause said means (152) for rejecting the material in said zone (10) to reject said material.

12. Apparatus as claimed in claim 11, further comprising means (216, 204) for disabling the detection means (144, 162, 190) once a decision has been to accept or reject material in said zone (10) to ensure the detection signal is not further analysed to reverse the decision.

13. A detection device for use in detecting the amount or presence of material in a detection zone (10), said device comprising:
   a first electrode (2);
   a second electrode (4) having a narrow dimension relative to said first electrode and substantially parallel with respect to and opposite said first electrode (2); and
   a third electrode (6) which substantially surrounds, is substantially electrically isolated with respect to and is substantially larger than said second electrode (4);
   said detection zone (10) being located between said first electrode (2) and said second electrode (4),
   said receiving means including a high gain amplifier (16) coupled to the second and third electrodes (4, 6) for maintaining said second and third electrodes at substantially the same electrical potential thereby to establish a substantially linear electric field between said first electrode (2) and said second electrode.

14. Apparatus for detecting the amount or presence of material in a detection zone, said apparatus comprising:

a first electrode;

input signal means for supplying an electric input signal to the first electrode;

a second electrode, said detection zone being located between said first and second electrodes;

a third electrode closely spaced from the second electrode and substantially larger than the second electrode; and receiving means for detecting signals on the second electrode, the signal on the second electrode being responsive to material in the zone, said receiving means including a high gain amplifier (16) coupled to the second and third electrodes (4, 6) for maintaining said second and third electrodes at substantially the same electrical potential thereby to establish a substantially linear electric field between the first electrode (2) and the second electrode.

15. Apparatus for detecting the amount or presence of material in a detection zone, said apparatus comprising:

a first plate electrode;

input signal means for supplying an electric input signal to the first electrode;

a second electrode, said detection zone being located between said first and second electrodes;

a third plate electrode parallel to and spaced from the first electrode, said third electrode being closely spaced from the second electrode and substantially larger than the second electrode; and receiving means for detecting signals on the second electrode, the signal on the second electrode being responsive to material in the zone, said receiving means including a high gain amplifier (16) coupled to the second and third electrodes (4, 6) for maintaining said second and third electrodes at substantially the same electrical potential thereby to establish a substantially linear electric field between the first electrode (2) and the second electrode.

16. Apparatus for detecting the amount or presence of material passing through a detection zone in a first direction, said apparatus comprising:

first electrode means;

input signal means for supplying an electric input signal to the first electrode means;

second electrode means, said detection zone being located between said first and second electrode means the second electrode means being narrow relative to said first electrode means and extending parallel to said first direction;

third electrode means closely adjacent to the second electrode means and being substantially larger than the second electrode means; and receiving means for detecting signals on the second electrode means, the signal on the second electrode means being responsive to material in the zone, said receiving means including a high gain amplifier (16) coupled to the second and third electrode means (4, 6) for maintaining said second and third electrode means at substantially the same electrical potential thereby to establish a substantially linear electric field between the first electrode means (2) and the second electrode means.

* * * * *